United States Patent
Massoudifar et al.

(10) Patent No.: US 10,740,619 B2
(45) Date of Patent: Aug. 11, 2020

(54) CHARACTERIZING CONTENT WITH A PREDICTIVE ERROR REPRESENTATION

(71) Applicant: Uber Technologies, Inc., San Francisco, CA (US)

(72) Inventors: Pegah Massoudifar, Mountain View, CA (US); Vijay Mahadevan, San Francisco, CA (US); Jonathan Berliner, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 96 days.

(21) Appl. No.: 16/118,441

(22) Filed: Aug. 31, 2018

(65) Prior Publication Data

US 2019/0156125 A1    May 23, 2019

Related U.S. Application Data

(60) Provisional application No. 62/589,494, filed on Nov. 21, 2017.

(51) Int. Cl.
*G06K 9/00* (2006.01)
*G06K 9/62* (2006.01)
(Continued)

(52) U.S. Cl.
CPC ......... *G06K 9/00744* (2013.01); *G06F 16/43* (2019.01); *G06F 16/483* (2019.01);
(Continued)

(58) Field of Classification Search
CPC ............. G06K 9/00744; G06K 9/6218; G06K 9/6228; G06F 16/43; G06F 16/483;
(Continued)

(56) References Cited

U.S. PATENT DOCUMENTS

| | | | |
|---|---|---|---|
| 2013/0103620 A1* | 4/2013 | Yoon | G06K 9/6228 706/12 |
| 2013/0156319 A1* | 6/2013 | Lyuh | G06K 9/6269 382/190 |

FOREIGN PATENT DOCUMENTS

WO    WO-2004100556 A2 *  11/2004   ........... H04N 19/192

OTHER PUBLICATIONS

High Accuracy Optical Flow Based Future Image Frame Predictor Model, Nishchal K. Verma, Dhekane Eeshan Gunesh, G. S. S. Srinivas Rao, Aakansha Mishra Department of Electrical Engineering Indian Institute of Technology, Kanpur, IEEE 2015 (Year: 2015).*

(Continued)

*Primary Examiner* — Khai M Nguyen
(74) *Attorney, Agent, or Firm* — Fenwick & West LLP

(57) ABSTRACT

A media item comprising a set of frames is received by a feature extraction system. A frame predictor is executed on each frame of the set of frames. An error representation is extracted for each frame of the set of frames during the execution of the frame predictor. An error-based feature vector is generated from the error representations associated with each frame of the set of frames. A seed media item is identified having a first error-based feature vector. A similarity score is determined among the first error-based feature vector and each error-based feature vector of a set of error-based feature vectors. A subset of error-based feature vectors, hence a subset of corresponding media items, is selected based on similarity score.

18 Claims, 7 Drawing Sheets

(51) Int. Cl.
*G06N 20/00* (2019.01)
*G06F 16/43* (2019.01)
*G06N 3/04* (2006.01)
*G06N 3/08* (2006.01)
*G06F 16/483* (2019.01)

(52) U.S. Cl.
CPC ......... *G06K 9/6218* (2013.01); *G06K 9/6228* (2013.01); *G06N 3/0445* (2013.01); *G06N 3/0454* (2013.01); *G06N 3/08* (2013.01); *G06N 20/00* (2019.01)

(58) Field of Classification Search
CPC .... G06N 20/00; G06N 3/0445; G06N 3/0454; G06N 3/08
See application file for complete search history.

(56) References Cited

OTHER PUBLICATIONS

Image Quality Assessment: From Error Visibility toStructural Similarity, Zhou Wang, Member, IEEE, Alan Conrad Bovik, Fellow, IEEE, Hamid Rahim Sheikh, Student Member, IEEE, and Eero P. Simoncelli, Senior Member, IEEE (Year: 2004).*

* cited by examiner

500

CHARACTERIZING CONTENT WITH A PREDICTIVE ERROR REPRESENTATION

CROSS REFERENCE TO RELATED APPLICATIONS

This application claims the benefit of and priority to U.S. Provisional Application No. 62/589,494, filed Nov. 21, 2017, which is incorporated by reference herein in its entirety.

BACKGROUND

1. Field of the Invention

This invention pertains to feature vector generation for a set of frames of sequential content, such as video.

2. Description of the Related Art

Feature engineering is important to machine learning, yet it is time consuming and expensive to effectively evaluate and determine features for characterizing items for machine modeling. Identifying and extracting useful features for media items, such as videos, comprising a set of frames can be especially difficult, particularly when determining features that are not human-selected. This challenge of feature selection is magnified for sets of frames having temporal variations.

SUMMARY

A feature extraction system uses a frame predictor to characterize a media item and identify features descriptive of the media item without requiring human labeling or selecting of such features. To identify features for characterizing the media item, the 'error' of the frame predictor is used to characterize the media item, representing how the media item's set of frames differs from the frame predictor's predicted frames for the media item. In this way, error-based features characterizing the media item may capture the ways in which the media item "differs" from how the frame predictor expects the media item to change over time. Prediction error is a particularly effective basis for generating discriminatory features of media items.

A frame predictor is a computer model that predicts a subsequent frame of a media item based on one or more prior frames of the media item's set of frames. To improve generation of additional frame predictions, the frame predictor may compare the generated frame prediction to the actual subsequent frame of the media item's set of frames and generate an error representation that describes how the predicted frame differs from the actual frame. By adjusting in response to the error representations for part or all of the frames in the media item's set of frames, the frame predictor may improve its generation of subsequent frame predictions for the media item's set of frames by better modeling characteristics of how the media item varies temporally throughout the set of frames.

These automated frame predictors, which predict frames based on an input set of frames, are used to assist in identifying features to characterize a media item. These features may be used for labeling or searching for media items, such as for unsupervised clustering of similar media items, or for identifying similar media items in response to a search query using a media item as a search term. As mentioned above, frame predictors may generate error representations in the process of frame prediction. Error representations in general describe aspects of sets of frames that are not predictable by the system. As such, similar sets of frames are more likely to have similar error representations than dissimilar sets of frames. Hence error representations may be used to characterize media items, serving as features of media items for purposes such as searching and categorization.

By developing a system to first extract the error representations from the frame predictor for a given input set of frames, then use those extracted error representations to generate a feature vector for the given input set of frames, feature extraction to characterize a media item may be performed with automated identification of discriminatory characteristics. Since such feature vectors are based on frame prediction error, they tend to be similar for sets of frames having content moving or changing in unpredicted but similar ways across frames, and as such may be used to characterize media items with temporal variations that may be similar but difficult for a human to characterize. As such, the system can use feature vectors based on frame prediction error to cluster media items comprising sets of frames. These clusters can then be treated as relating to a similar concept because the frame predictor erred in predictions for clustered media items in similar ways, implying similar unpredictable aspects exist among the clustered media items.

DETAILED DESCRIPTION

A feature vector is an n-dimensional vector of numerical features that represent an object. Feature vectors may be used as numerical representations of objects in machine learning, such as for pattern recognition by comparing various feature vectors. For example, feature vectors representing photos could be used to classify the photos into different categories. If the classification categories are pre-determined by a person, the classifying is "supervised." If the categories are created dynamically in the classifying process, the categorizing is "unsupervised." Another form of classifying is unsupervised clustering, where objects are clustered into "clusters" in such a way that objects in the same cluster are more similar to each other than objects in other groups. Machine learning such as this is typically performed using a computer system.

A media item comprises an ordered set of frames, and a frame comprises an ordered set of data, e.g. pixels. For example, the media item could be a video, where each frame of the video is a matrix of pixels representing an image for that frame of the video. A frame predictor is a system for predicting a next frame given a set of previous frames. The frame predictor can be used on the media item to generate a frame prediction for each frame in the media item's set of frames. The frame predictor compares each frame prediction to the corresponding predicted frame in the set of frames and thereby generates error representations representing the error of each prediction. In one embodiment, as each frame is predicted, its error representation is generated and used to improve the next prediction. Depending upon the embodiment, the frame predictor can be a trained computer model.

In some embodiments, media items additionally comprise audio data associated with each frame, and the frame predictor may use the audio data of a frame when predicting a next frame, which may include predicting audio data for the next frame. For example, the frame predictor may perform a prediction process for audio data that is similar to the prediction process for frames. The frame predictor may predict the volume of different frequencies of sound at each frame, where each frequency is analogous to a pixel of the frame and the volume of the frequency is analogous to the color value of the pixel.

Figure 1:
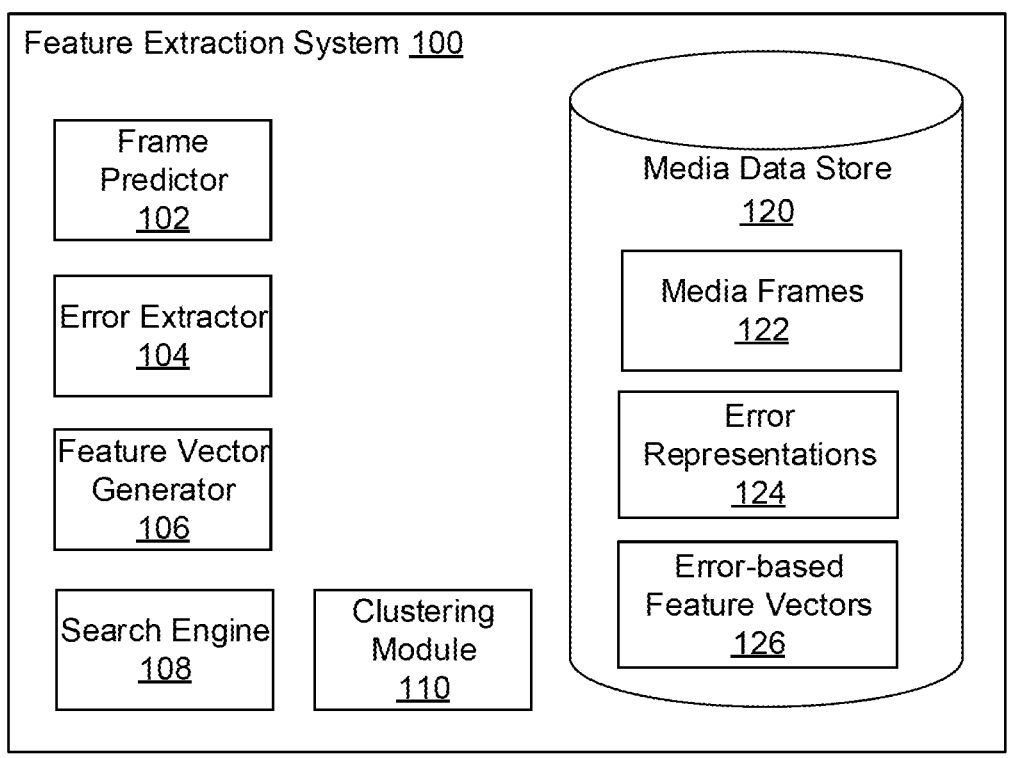
FIG. 1 is a high-level block diagram illustrating a feature extraction system in one embodiment.

FIG. 1 is a high-level block diagram illustrating a feature extraction system 100 in one embodiment. The feature extraction system 100 comprises a frame predictor 102, an error extractor 104, a feature vector generator 106, a search engine 108, a clustering module 110, and a media data store 120. The media data store 120 contains data comprising media frames 122, error representations 124, and error-based feature vectors 126.

The frame predictor 102 predicts frames based on an input media item. Each frame is predicted using at least a set of previous frames from the media item. The frame predictor 102 generates error representations associated with each frame in the course of creating frame predictions. In one embodiment, the frame predictor is a machine learning model trained on various sets of frames such that it can be used to predict frames for sets of frames that the model has not encountered before. Machine learning algorithms used in the model may include support vector machines (SVMs), boosting for other algorithms (e.g., AdaBoost), neural net, logistic regression, naïve Bayes, memory-based learning, random forests, bagged trees, boosted trees, boosted stumps, and so on. The frame predictor 102 may involve convolutional and/or deconvolutional neural networks, depending upon the embodiment.

One example of a frame predictor 102 is a predictive neural network trained to predict future frames in a video sequence. As one example, a predictive neural network may include a series of repeating stacked neuron groups that attempt to make local predictions of a frame input to the neuron group, which is then subtracted from the actual input frame and passed along to the next neuron group. Each neuron group includes an input convolutional layer, a recurrent representation layer, a prediction layer, and an error representation. The recurrent representation layer is a recurrent convolutional network that generates a prediction of what the next input frame will be. The neuron group takes the difference between the frame prediction and the actual predicted frame and outputs the error representation, which is split into separate rectified positive and negative error populations. The error representation is passed forward through the convolutional layer to become the input frame to the next neuron group. The recurrent prediction layer receives a copy of the error representation from its neuron group along with top-down input from the recurrent representation layer of the next neuron group in the series. The organization of the network is such that one side of the network is equivalent to a standard deep convolutional network, while the other side is equivalent to a generative deconvolutional network, with local recurrence at each stage.

The error extractor 104 extracts error representations from the frame predictor 102. For each predicted frame, the associated error representation is extracted and stored in a set of error representations, which is associated with the media item being predicted. For example, the error representation at each neuron group in the network may be extracted at each pass through the network, as each frame is input. Alternatively, only the error representation of the "bottom" or "first" neuron group is extracted at each pass through the network. The error extractor 104 may be, for example, software that operates concurrently with the frame predictor 102, which in turn may be configured to output error representations one or more times during operation. The set of error representations for a given media item is passed by the error extractor 104 to the feature vector generator 106 to begin the process of creating a feature vector for the given media item.

The feature vector generator 106 generates a feature vector to numerically represent a media item based on its associated set of error representations. A feature vector characterizes a media item. The generation of a feature vector using a set of error representations can be automated using a computer model, such as a machine learning model trained to generate a feature vector. In one embodiment the set of error representations is averaged to generate a single averaged error representation, using TensorFlow™ for example. Certain error representations may be weighed more than others, such as error representations corresponding to frames at certain positions in the set of frames. For example, error representations corresponding to frames at least a threshold number of positions into the set of frames may be weighed more, and an error representation corresponding to a first frame in the set of frames may be weighed less. Depending upon the embodiment, additional and/or other operations may be performed upon the set of error representations to generate the feature vector, such as feature reduction to reduce the number of features in the feature vector.

The search engine 108 can use an input error-based feature vector 126 to identify media items similar to the media item associated with the input error-based feature vector 126 by comparing the input error-based feature vector 126 to the error-based feature vectors 126 stored in the media data store 120. Media items associated with error-based feature vectors 126 identified as similar to the input error-based feature vector 126 by the search engine 108 are "search results" and, in an embodiment, are displayed to a user, such as within a user interface on a computer display.

For example, a video identified as involving automobile fraud, e.g. a person walking up to a car and throwing themselves upon the hood of the car, is associated with a first error-based feature vector 126. Using the first error-based feature vector 126 as the input error-based feature vector 126, other videos of similar automobile fraud can be identified using the search engine 108. This may be useful for, for example, an auto insurance company to identify cases of fraud in a database of many videos that would take substantial amounts of time to go through manually. By identifying one video as fraudulent, additional videos can be identified by the similarity with respect to the error-based feature as an alternative or supplement to approaches that explicitly label the initial video or the additional videos with respect to particular objects or types of actions in the videos.

One feature vector is identified as similar to another if they are within a similarity threshold of each other. The similarity threshold may be, for example, a maximum distance in a feature space, wherein each feature is projected onto a dimension in the space. For example, if two feature vectors each have three numerical features, the feature space may be three-dimensional, each dimension mapping to a feature, and the threshold similarity may be a Euclidian distance between the two feature vectors as projected into the feature space. The search engine 108 may compute a distance measurement (or "similarity score") from the input error-based feature vector 126 to each error-based feature vector 126 stored in the media data store 120 and identify as search results those error-based feature vectors 126 with a similarity score no greater than the similarity threshold (meaning they are no more than a certain distance away from the input error-based media item in feature space). In an embodiment the similarity threshold is dynamic and dependent upon the relative similarities of the error-based feature vectors 126 with one another. For example, the similarity threshold may be an average of the distance measurement for each error-based feature vector 126 within which are no more than 1% of the other feature vectors in the set.

The clustering module 110 clusters similar error-based feature vectors 126 using machine learning techniques. This may be an unsupervised process, meaning the clustering module 110 determines the number of clusters and the sorting of error-based feature vectors 126 therein. Error-based feature vectors 126 within a cluster are those considered similar to one another, i.e. within the similarity threshold of one another. Alternatively, an error-based feature vector 126 is sorted into a cluster if it is within a cluster threshold distance measurement of a center point of the cluster in feature space.

If a first error-based feature vector 126 is similar to at least one error-based feature vector 126 in a cluster, the other error-based feature vectors 126 in the cluster may be similar as well. For example, if the search engine 108 performs a search using a first error-based feature vector 126 and finds it to be similar to a second error-based feature vector 126 that is part of a cluster, the resultant search results may comprise the media items associated with the second error-based feature vector 126 and the other error-based feature vectors 126 of the cluster.

The media data store 120 stores media items for the system and characterizations of the media items. The media data store 120 comprises media items such as media frames 122, and characterizations of the media items such as error representations 124 and error-based feature vectors 126. Typically, a given media item includes a set of media frames 122 and is associated with a set of error representations 124 and an error-based feature vector 126. Metadata associated with objects within the media data store 120 may also be stored in the media data store 120. In one embodiment the media data store 120 is implemented using a relational database. In another embodiment, the media data store 120 is implemented using a non-relational database. Each store of the media data store 120 may exist in separate physical locations in memory or as parts of one physical memory space, depending upon the embodiment.

Media frames 122 are individual frames within a set of frames for a given media item. The set of frames is ordered, which may contribute to a temporal feature of the set of frames that can be captured by error representations 124. Sets of frames may be compressed for storage in the media data store 120, and may be uncompressed when used, such as when used as input to a frame predictor 102. A media frame 122 may be, for example, a raster or vector image represented using one or more numerical values.

Error representations 124 are associated with media frames 122 and are extracted by the error extractor 104 as the frame predictor 102 operates upon media frames 122. For example, an error representation 124 is a set of values representative of the difference between a predicted frame and an actual frame that is being predicted. Each value in the set of values may be, for example, a difference between a predicted value and an actual value at a certain pixel in each frame.

Error-based feature vectors 126 are associated with media frames 122 and are a product of the feature vector generator 106 after it has operated upon a set of error representations 124. An error-based feature vector 126 is a feature vector used to characterize a set of error representations 124. In an embodiment error-based feature vectors 126 are numerical. Error-based feature vectors 126 can, for example, be used for categorization during supervised machine learning, or clustering during unsupervised machine learning.

Figure 2:
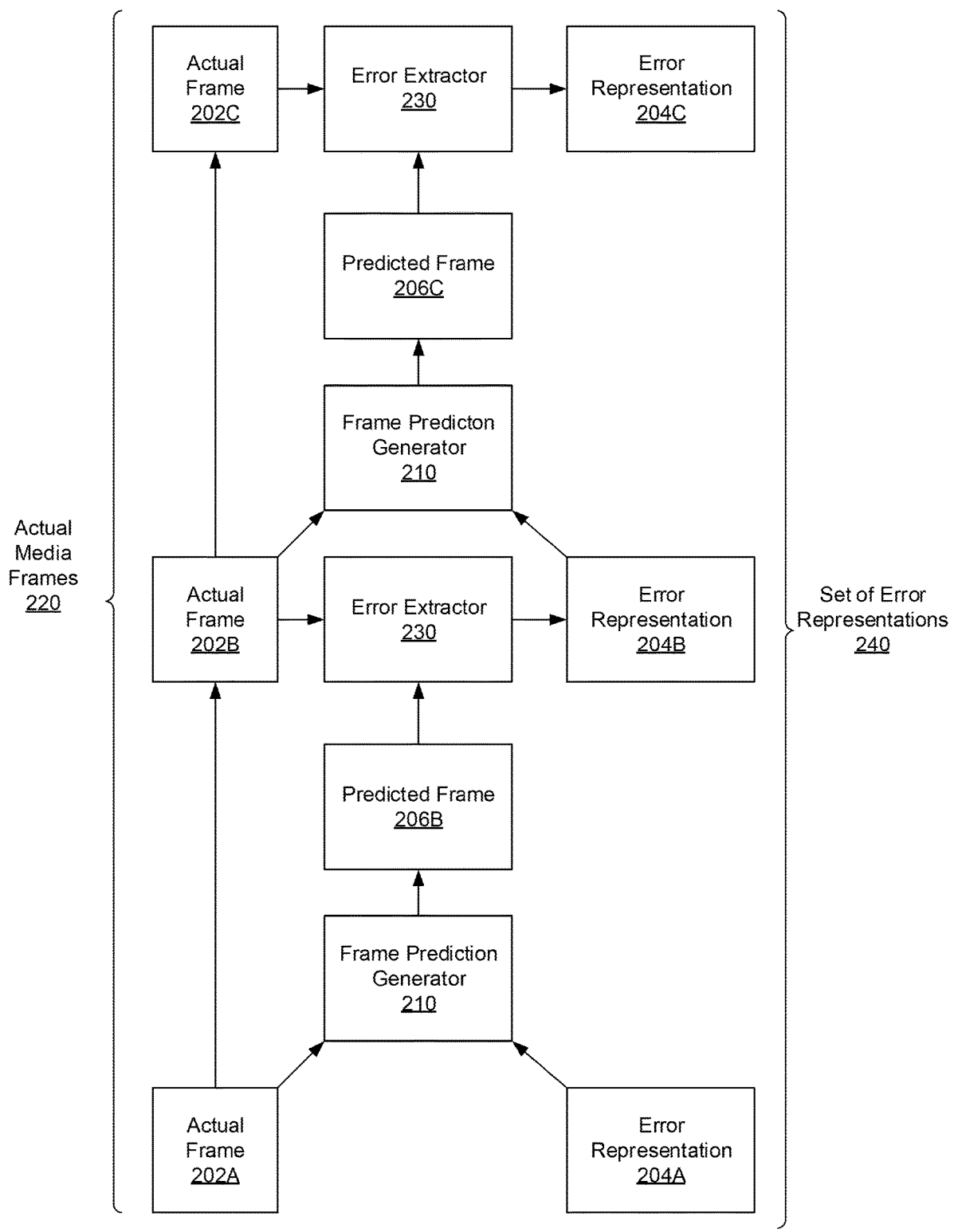
FIG. 2 is a high-level block diagram illustrating one embodiment of a frame predictor.

FIG. 2 is a high-level block diagram illustrating one embodiment of a frame predictor 102. Actual frames 202A, 202B, 202C are sequential frames of a set of frames. Associated with each is an error representation 204A, 204B, 204C, respectively. Sequentially, actual frame 202A and error representation 204A are input to a frame prediction generator 210. In an embodiment, the error representation 204A is a uniform set of equal terms since there is no prior frame to generate an error prediction from. The frame prediction generator 210 generates a predicted frame 206B predicting actual frame 202B. Actual frame 202B and predicted frame 206B are input to an error extractor 230 which generates error representation 204B. Error representation 204B and actual frame 202B are input to the frame prediction generator 210, which generates predicted frame 206C that predicts actual frame 202C. Actual frame 202C and predicted frame 206C are input to the error extractor 230, which produces error representation 204C. The error extractor 104 extracts the error representations 204 from the frame predictor 102. Depending upon the embodiment, the error extractor 104 extracts the error representations 204 at each generation of a certain error representation 204, or after the end of frame predictor 102 operation.

FIG. 2 uses like reference numerals to identify like elements. A letter after a reference numeral, such as "202A," indicates that the text refers specifically to the element having that particular reference numeral. A reference numeral in the text without a following letter, such as "202," refers to any or all of the elements in the figures bearing that reference numeral. For example, "202" in the text refers to reference numerals "202A," "202B," and/or "202C" in the figures.

Figure 3:
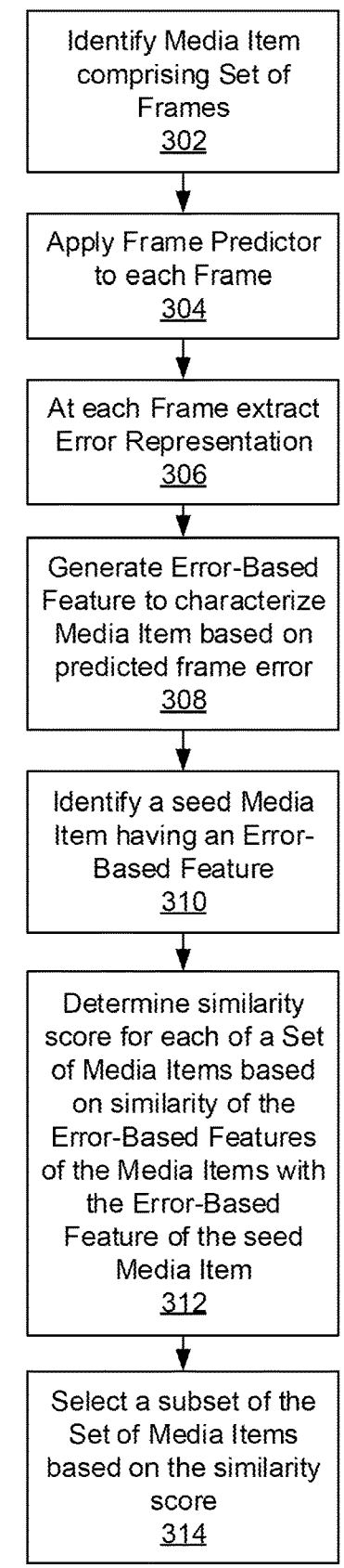
FIG. 3 illustrates the process for generating and classifying an error-based feature vector, according to one embodiment.

FIG. 3 illustrates the process for generating and classifying an error-based feature vector, according to one embodiment. The process 300 begins when a particular media item comprising a set of frames is identified 302 by the system 100. Next, the frame predictor 102 is applied 304 to each frame of the media item's set of frames. For each frame of the media item's set of frames, as the frame predictor 102 executes, an associated error representation is extracted 306 using the error extractor 104. After, an error-based feature vector 126 to characterize the media item based on its predicted frame error is generated 308 by the feature vector generator 106. Then a seed media item having an error-based feature vector is identified 310. For example, the particular media item may be the seed media item and the error-based feature vector may be the generated 308 error-based feature vector. A similarity score is determined 312 for each of a set of media items based on similarity of the error-based feature vectors of the media items with the error-based feature vectors of the seed media item. Finally, a subset of the set of media items is selected 314 based on similarity score. For example, the subset of the set of media items includes those of the set of media items with error-based feature vectors within the similarity threshold of the seed media item's error-based feature vector.

Figure 4A:
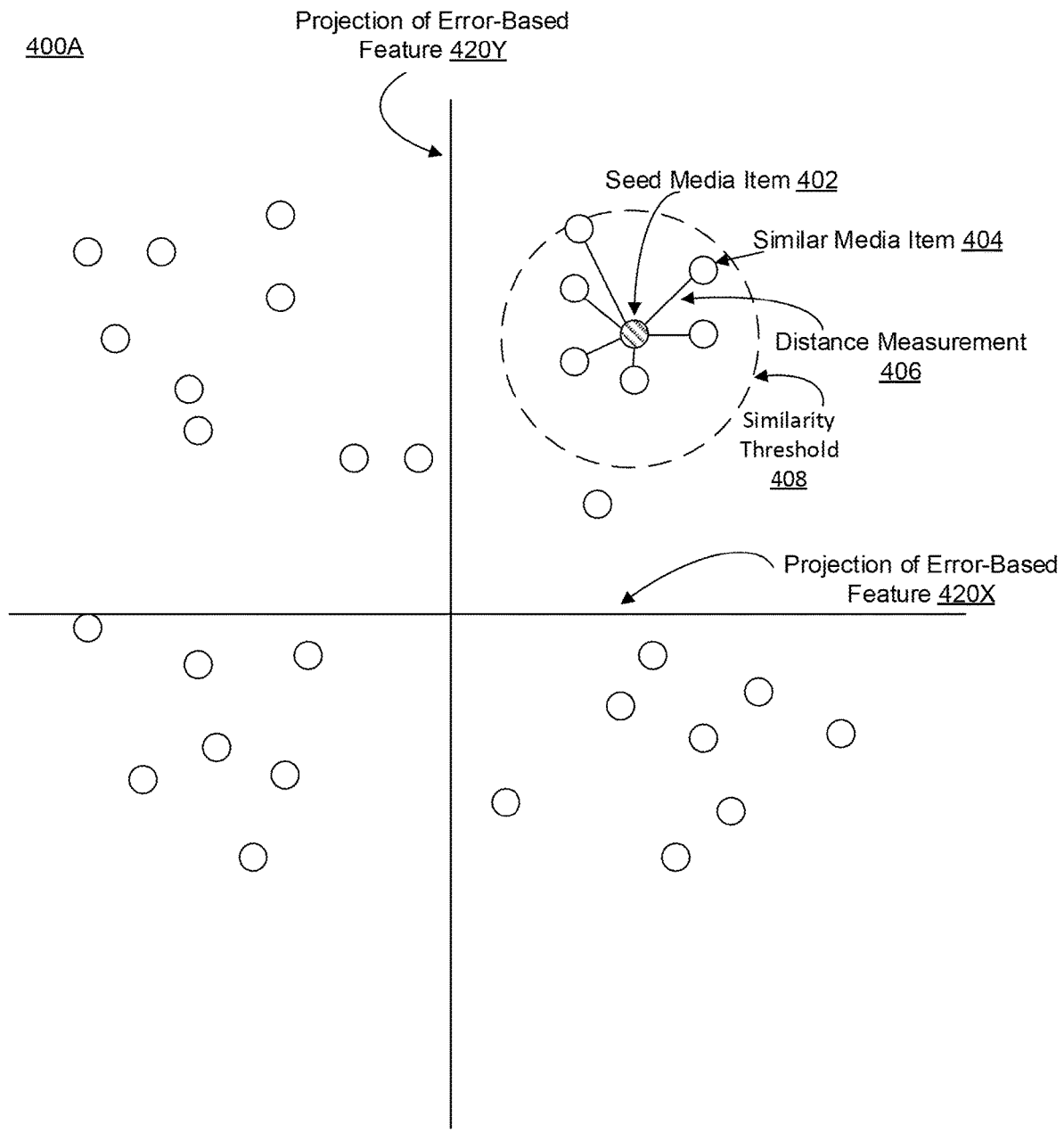
FIG. 4A illustrates a graph representing a first simplified example of two-feature error-based feature vectors projected in 2-dimensional space, according to one embodiment.

FIG. 4A illustrates a graph representing a first simplified example of two-feature error-based feature vectors projected in 2-dimensional space 400A, according to one embodiment. The vertical axis is a projection of one error-based feature 420Y and the horizontal axis is a projection of a second error-based feature 420X. Circles on the illustration represent error-based feature vectors, each error-based feature vector's relative position on the graph corresponding to a numerical value on each axis, those numerical values being various measurements of the feature corresponding with each axis. Seed media item 402 represents an error-based feature vector corresponding to a media item chosen for finding similar media items 404, f via the search engine 108. Similar media item 404 exemplifies a media item similar to the seed media item 402. The error-based feature vector of seed media item 402 is within a similarity threshold 408 distance measurement of the error-based feature vector of seed media item 402 in the 2-dimensional projection, that distance being a particular distance measurement 406. Feature vectors of media items with a distance measurement 406 less than the similarity threshold 408 from the feature vector of the seed media item 402 are said to be similar.

Figure 4B:
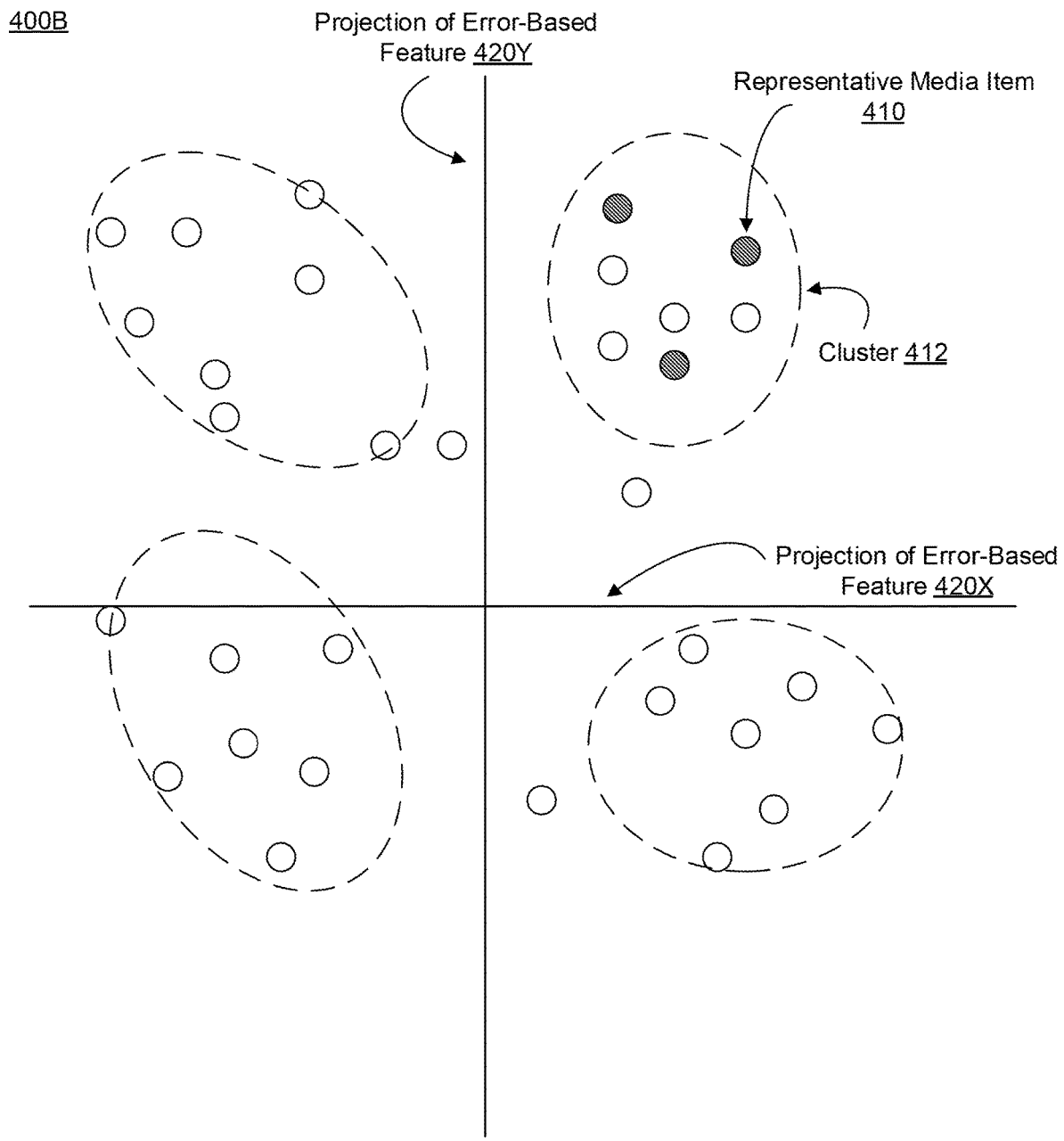
FIG. 4B illustrates a graph representing a second simplified example of two-feature error-based feature vectors projected in 2-dimensional space, according to one embodiment.

FIG. 4B illustrates a graph representing a second simplified example of two-feature error-based feature vectors projected in 2-dimensional space 400B, according to one embodiment. The vertical axis is a projection of one error-based feature 420Y and the horizontal axis is a projection of a second error-based feature 420X. Circles on the illustration represent error-based feature vectors, their relative position on the graph corresponding to numerical values on each axis, those numerical values being various measurements of the feature corresponding with each axis. Cluster 412 is a representation of one of four clusters in the example. Within the cluster 412 are a plurality of error-based feature vectors corresponding to media items. Any one feature vector within a cluster is similar to the others of that cluster. Representative media item 410 is an error-based feature vector representing a media item in the cluster 412, and can be used, alone or with other error-based feature vectors from the cluster, to characterize the entirety of the cluster. For example, if the representative media items, including representative media item 410, are identified as videos of automobile accidents involving garbage trucks, the cluster as a whole is characterized as videos of automobile accidents involving garbage trucks.

Figure 5:
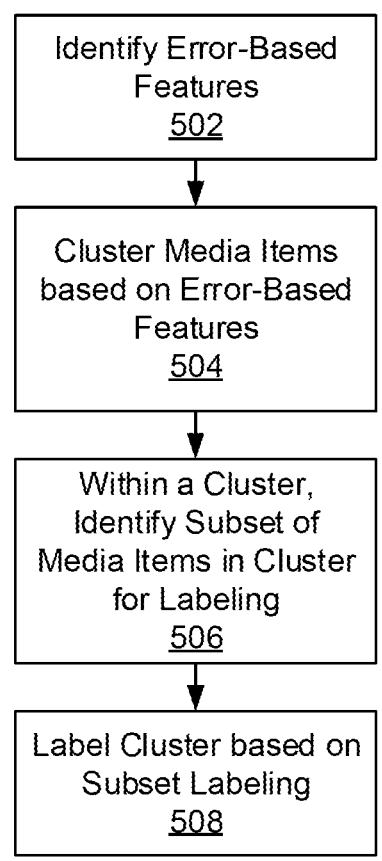
FIG. 5 illustrates the process of labeling clusters of error-based feature vectors, according to one embodiment.

FIG. 5 illustrates the process of labeling clusters of error-based feature vectors, according to one embodiment. The process may be performed by the feature extraction system 100. First, error-based feature vectors 126 are identified 502. For example, a subset of the error-based feature vectors 126 stored in the media data store 120. The identified error-based feature vectors are then clustered 504 by the clustering module 110. As such the media items associated with the error-based feature vectors are also clustered. A subset of media items of a cluster are identified 506 for labeling. The subset of media items is used to label 508 the entire cluster, and each media item represented within.

For example, a set of 100 feature vectors corresponding to 100 videos are clustered into four clusters. The clusters may be automatically generated by the unsupervised process described by FIG. 5. In one of the clusters, the videos associated with three of the clustered feature vectors are identified. A first of the three videos involves a car hitting a garbage truck. A second of the three videos involves a garbage truck driving into a street lamp. A third of the three videos involves a head on collision between two garbage trucks. As such, the cluster is labeled as "garbage truck accidents" and each video associated with a feature vector in the cluster is labeled as a "garbage truck accident." Videos may be identified and reviewed and labels may be applied by users of the system 100. Each video in the cluster may be labeled based on the analysis of just a subset of the videos in the cluster, since even though the clustering process is unsupervised, it can effectively cluster videos that appear similar to human users without requiring human input to the clustering process.

Figure 6:
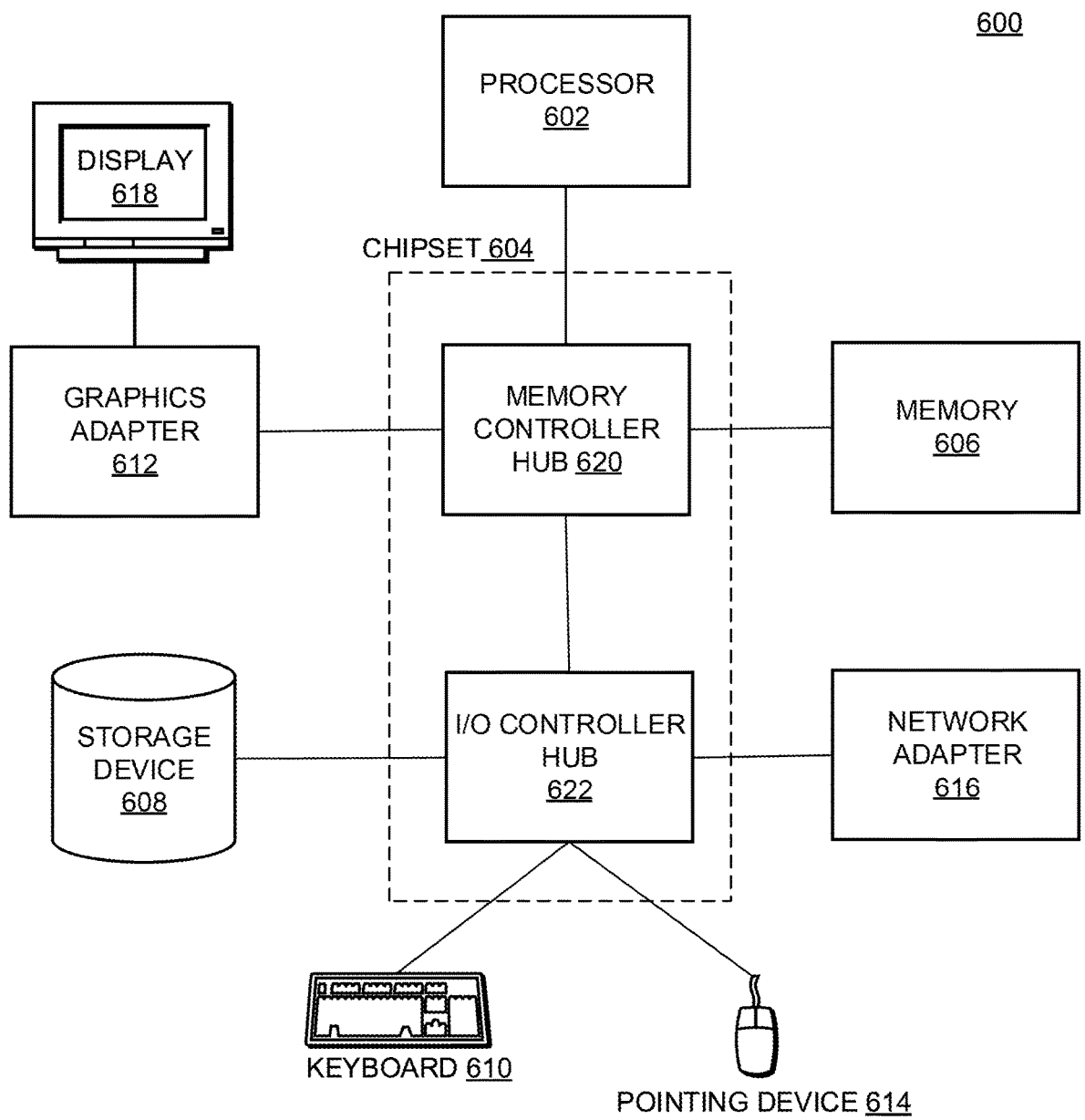
FIG. 6 is a high-level block diagram of a computer for acting as a feature extraction system in one embodiment.

The entities shown in FIG. 1 are implemented using one or more computers. FIG. 6 is a high-level block diagram of a computer 600 for acting as a feature extraction system 100 in one embodiment. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O controller hub 622. In another embodiment, the memory 606 is coupled directly to the processor 602 instead of the chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer system 600. The graphics adapter 612 displays images and other information on the display 618. The network adapter 616 couples the computer system 600 to a network in one embodiment.

As is known in the art, a computer 600 can have different and/or other components than those shown in FIG. 6. In addition, the computer 600 can lack certain illustrated components. For example, the computer acting as the feature extraction system 100 can be formed of multiple blade servers linked together into one or more distributed systems and lack components such as keyboards and displays. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method comprising:
   receiving a media item comprising an ordered set of frames;
   applying a frame predictor to one or more frames of the set of frames to generate a set of predicted frames, the frame predictor generating a subsequent frame of the media item based on at least one previous frame of the media item;
   comparing the set of predicted frames to the corresponding ordered set of frames and based on the comparison determining one or more error representations describing differences between the predicted frames and the corresponding frames of the media item;
   generating an error-based feature vector characterizing the media item based on one or more determined error representations;
   determining a similarity score for each media item of a set of media items, wherein the similarity score for each media item of the set of media items is based on a similarity measurement between the generated error-based feature vector and an error-based feature vector of the media item of the set of media items; and
   selecting a subset of the set of media items based on the determined similarity scores.

2. The method of claim 1, wherein selecting the subset of the set of media items based on the similarity score of each media item of the set of media items comprises selecting each media item of the set of media items with a similarity score within a similarity threshold.

3. The method of claim 1, further comprising: identifying a set of media items comprising the media item characterized by the generated error-based feature vector, wherein each media item of the set of media items is characterized by an error-based feature vector; and clustering the set of media items by clustering the error-based feature vectors that characterize the set of media items into a set of clusters.

4. The method of claim 3, further comprising: for each cluster in the set of clusters: identifying a subset of the error-based feature vectors clustered in the cluster; determining a label based on media items each characterized by one error-based feature vector of the subset of the error-based feature vectors; and labeling each media item associated with the error-based feature vectors clustered in the duster with the determined label.

5. The method of claim 1, further comprising: identifying a set of clusters, wherein each cluster comprises a set of error-based feature vectors that each characterize a media item; identifying a cluster of the set of clusters with a lowest similarity score to the generated error- based feature vector; and clustering the generated error-based feature vector into the identified cluster.

6. The method of claim 5, wherein identifying the cluster of the set of clusters with the lowest similarity score comprises: identifying a similarity score for each error-based feature vector in each cluster in the set of clusters; averaging the similarity scores of the error-based feature vectors of each cluster in the set of clusters; and identifying the cluster in the set of clusters with the lowest average similarity score.

7. The method of claim 5, further comprising: identifying a label associated with the identified cluster; and labeling the media item characterized by the generated error-based feature vector with the identified label.

8. The method of claim 1, further comprising: identifying a set of categories, wherein each category in the set of categories categorizes a subset of a set of media items characterized by error-based feature vectors; determining a similarity score for each category in the set of categories; and based on the determined similarity scores, categorizing the media item characterized by the generated error-based feature vector into one category of the set of categories.

9. The method of claim 1, wherein the frame predictor is a predictive neural network.

10. A non-transitory computer-readable storage medium storing computer program instructions executable by a processor to perform operations comprising:
    receiving a media item comprising an ordered set of frames;
    applying a frame predictor to one or more frames of the set of frames to generate a set of predicted frames, the frame predictor generating a subsequent frame of the media item based on at least one previous frame of the media item;
    comparing the set of predicted frames to the corresponding ordered set of frames and based on the comparison determining one or more error representations describing differences between the predicted frames and the corresponding frames of the media item,
    generating an error-based feature vector characterizing the media item based on one or more determined error representations;
    determining a similarity score for each media item of a set of media items, wherein the similarity score for each media item of the set of media items is based on a similarity measurement between the generated error-based feature vector and an error-based feature vector of the media item of the set of media items; and
    selecting a subset of the set of media items based on the determined similarity scores.

11. The non-transitory computer-readable storage medium of claim 10, wherein selecting the subset of the set of media items based on the similarity score of each media tern of the set of media items comprises selecting each media item of the set of media items with a similarity score within a similarity threshold.

12. The non-transitory computer readable storage medium of claim 10, the operations further comprising: identifying a set of media items comprising the media item characterized by the generated error-based feature vector, wherein each media item of the set of media items is characterized by an error-based feature vector; and clustering the set of media items by clustering the error-based feature vectors that characterize the set of media items into a set of clusters.

13. The non-transitory computer-readable storage medium of claim 12, the operations further comprising: for each cluster in the set of clusters: identifying a subset of the error-based feature vectors clustered in the cluster; determining a label based on media items each characterized by one error-based feature vector of the subset of the error-based feature vectors; and labeling each media tern associated with the error-based feature vectors clustered in the cluster with the determined label.

14. The non-transitory computer-readable storage medium of claim 10, the operations further comprising: identifying a set of clusters, wherein each cluster comprises a set of error-based feature vectors that each characterize a media item; identifying a cluster of the set of clusters with a lowest similarity score to the generated error- based feature vector; and clustering the generated error-based feature vector into the identified cluster.

15. The non-transitory computer-readable storage medium of claim 14, wherein identifying the cluster of the set of clusters with the lowest similarity score comprises: identifying a similarity score for each error-based feature vector in each cluster in the set of clusters; averaging the similarity scores of the error-based feature vectors of each cluster in the set of clusters; and identifying the cluster in the set of clusters with the lowest average similarity score.

16. The non-transitory computer-readable storage medium of claim 14, the operations further comprising: identifying a label associated with the identified cluster; and labeling the media item characterized by the generated error-based feature vector with the identified label.

17. The non-transitory computer-readable storage medium of claim 10, the operations further comprising: identifying a set of categories, wherein each category in the set of categories categorizes a subset of a set of media items characterized by error-based feature vectors; determining a similarity score for each category in the set of categories; and based on the determined similarity scores, categorizing the media item characterized by the generated error-based feature vector into one category of the set of categories.

18. The non-transitory computer-readable storage medium of claim 10, wherein the frame predictor is a predictive neural network.

\* \* \* \* \*